United States Patent [19]
Rolph

[11] 4,179,718
[45] Dec. 18, 1979

[54] FLEXIBLE MAGNETIC RECORDING DISC DRIVE WITH INTERLOCK TO PROTECT RECORDING DISC CARTRIDGE

[75] Inventor: Donald L. Rolph, Pleasanton, Calif.

[73] Assignee: Memorex Corporation, Santa Clara, Calif.

[21] Appl. No.: 830,136

[22] Filed: Sep. 2, 1977

[51] Int. Cl.² .............................................. G11B 5/016
[52] U.S. Cl. ....................................................... 360/99
[58] Field of Search ..................................... 360/99, 97

[56] References Cited

U.S. PATENT DOCUMENTS

| 3,770,908 | 11/1973 | Craggs | 360/97 |
| 3,890,643 | 6/1975 | Dalziel | 360/99 |
| 4,040,106 | 8/1977 | Medley | 360/99 |
| 4,146,912 | 3/1979 | Kukreja | 360/99 |

OTHER PUBLICATIONS

Goplen et al., "Combined Stop and Diskette Seating Mech.", IBM Tech. Disc. Bull., vol. 19, No. 8, Jan. 1977, pp. 3167-3169.

Primary Examiner—Robert S. Tupper

[57] ABSTRACT

In a disc drive for use with an operator inserted flexible magnetic recording disc cartridge means are disclosed for preventing closing of the cartridge access door and the disc clamping means if a recording disc cartridge is only partially inserted.

8 Claims, 9 Drawing Figures

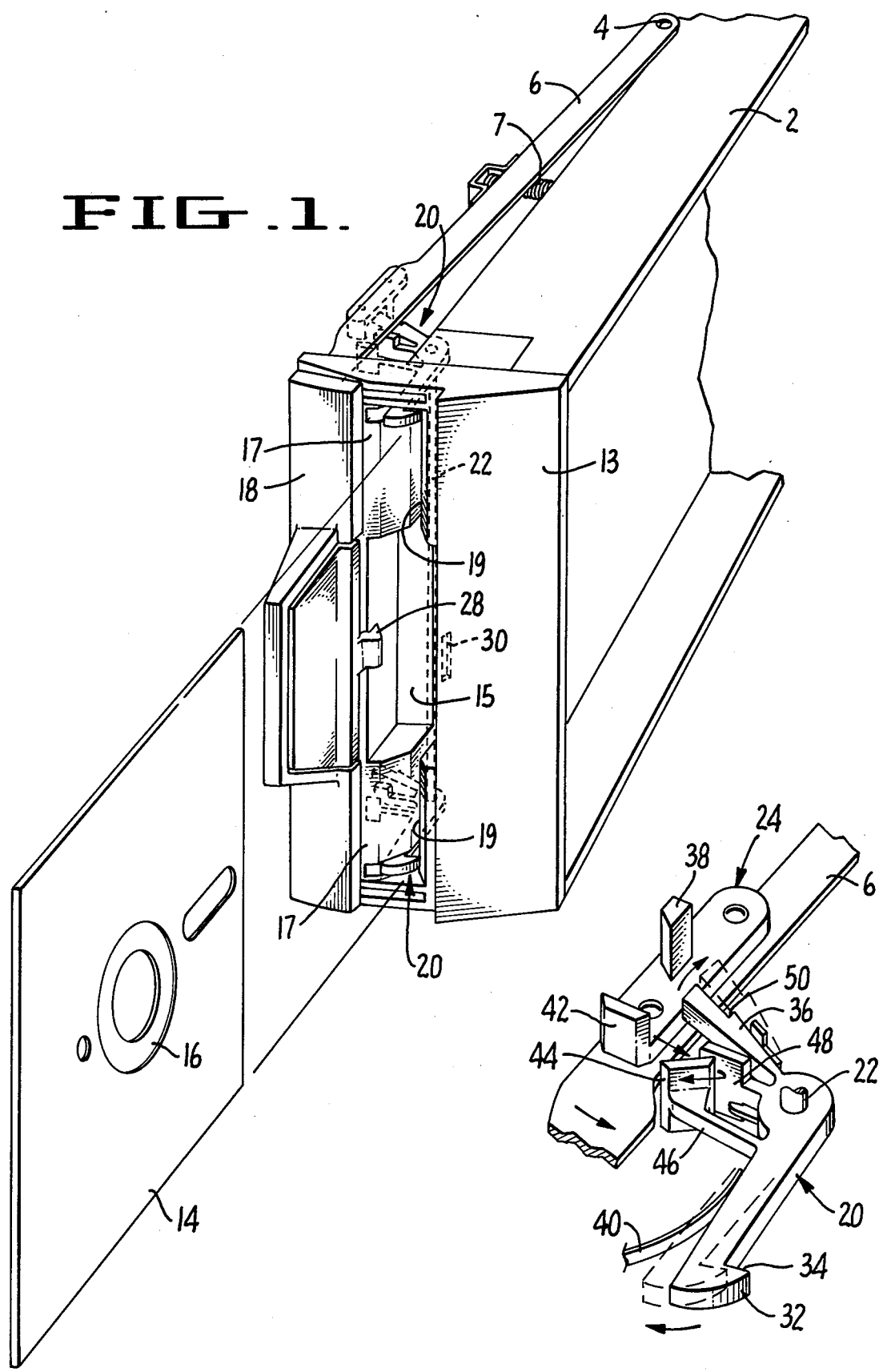

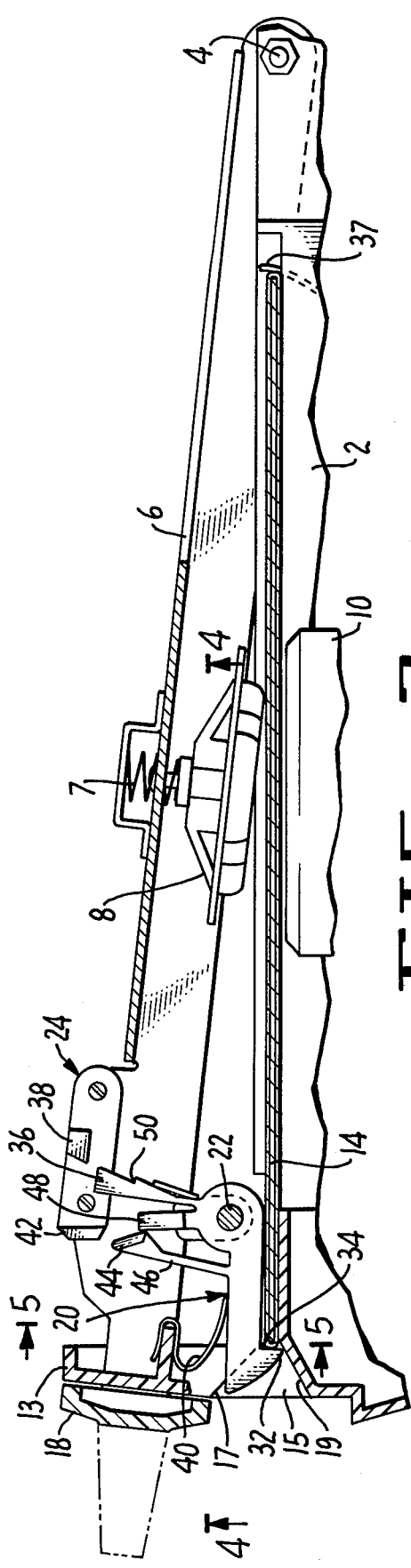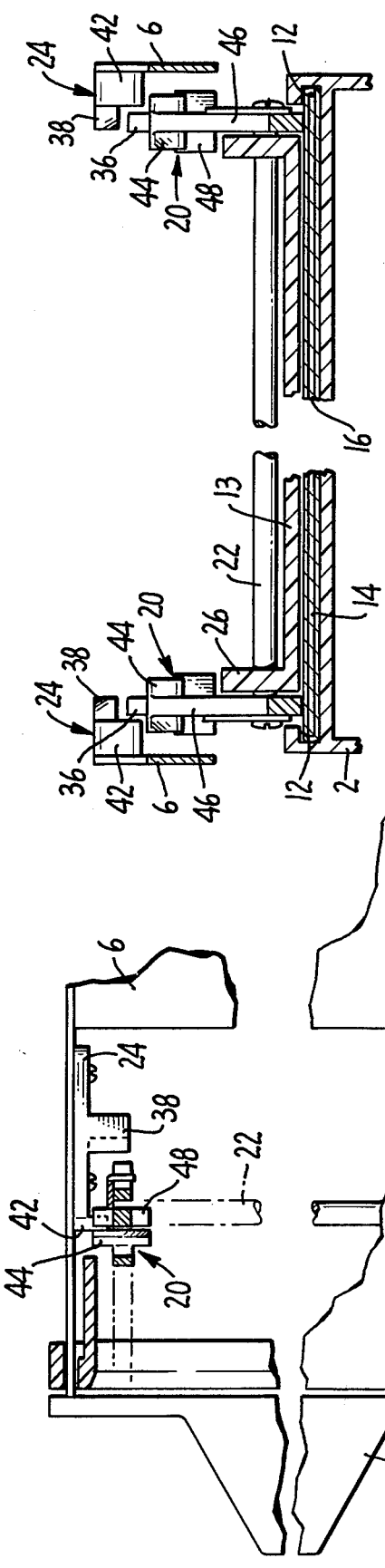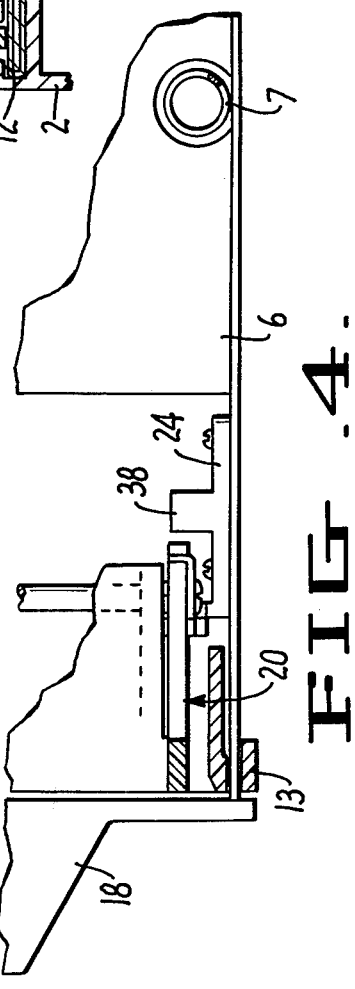

FLEXIBLE MAGNETIC RECORDING DISC DRIVE WITH INTERLOCK TO PROTECT RECORDING DISC CARTRIDGE

BACKGROUND OF THE INVENTION

The requirements in many data processing applications for storing relatively small amounts of information on removable and replaceable media have led to the development of disc drives incorporating inexpensive, flexible, removable magnetic recording discs. Exemplary of these disc drives is the Memorex Model 550, which accepts an industry standard removable recording disc contained within a protective envelope, the combination of the disc and envelope forming an easily handled recording disc cartridge such as that known in the trade as the Memorex Markette TM flexible disc cartridge. With these disc cartridges and drive units numerous different types of data may be stored, including program subroutines and diagnostic routines as well as process control data.

One of the highly desirable features of these relatively small and inexpensive storage devices is the ready removability and replaceability of the disc cartridges, thus providing for ready removability and replaceability of different data packages within the storage system. However, due to the thin and flexible nature of the disc recording media, one problem with these units has been that of protecting the disc cartridges against damage, particularly during insertion and removal of the cartridge from the disc drive unit. Frequently with prior art disc drive units the disc receiving structure, which receives a disc into the drive unit and then clamps it into engagement with a rotating spindle has been inadvertently closed with the disc less than fully inserted, thus often creasing or tearing the recording media and possibly destroying the usefulness of a disc cartridge so damaged. This problem has often arisen in prior art disc drives due to the absence of a positive indication of a full and proper insertion and registration of the disc cartridge therewithin and the absence of means for preventing improper closing and engagement of the disc cartridge when less than fully inserted. Similar problems have resulted from improper closing of access doors upon less than fully inserted discs, frequently also causing damage to the disc cartridge.

SUMMARY OF THE INVENTION

In view of the foregoing disadvantages and problems of numerous prior art disc drives, it is an object of this invention to provide a disc drive in which the disc receiving and clamping means and the access door to such receiving means may be closed over an inserted disc cartridge only if that cartridge is fully inserted. It is another object of this invention to provide such a disc drive which further includes means for sensing whether an inserted disc cartridge is fully inserted or not and for providing to an inserting operator a tactile signal when the cartridge is fully inserted. It is yet another object of this invention to provide such a disc drive which further includes means for preventing reclosing of an outer access door which has been partially opened, if the previously inserted cartridge has been released from its fully inserted position. It is still a further object of this invention to provide such means for preventing closing on a less than fully inserted cartridge, with such closing preventing means being relatively simple and economical to manufacture.

To achieve the above and other objects, a disc drive for use with an operator inserted flexible magnetic recording disc cartridge is disclosed, comprising selectively openable and closable means for receiving an inserted cartridge and including means for releasably clamping the recording disc contained within the cartridge in a position for recording and playback when the receiving means is closed, door means selectively movable between a fully closed position covering and a fully open position exposing access to the receiving means from outside the disc drive, and interlock means to prevent closing of the door and the clamping means if an inserted cartridge is only partially inserted. Such interlock means itself comprises means for sensing the insertion of a disc cartridge into the receiving means when the receiving means is open and for sensing whether the cartridge is fully inserted or not and for providing to the inserting operator a tactile signal when the cartridge is fully inserted. The interlock further includes means cooperating with the cartridge insertion sensing means for preventing both the closing of the receiving means and engagement between the door means and cartridge if an inserted cartridge is less than fully inserted.

BRIEF DESCRIPTION OF THE DRAWINGS

This invention will be described in greater detail with respect to one particularly preferred embodiment in which:

FIG. 1 is a front perspective view of a disc drive unit of this invention;

FIG. 2 is a perspective view of the interlock and disc retaining means of this invention;

FIG. 3 is a partial side sectional view of the apparatus of FIG. 1 in an open configuration with a disc cartridge fully inserted;

FIG. 4 is a fragmentary plan view in section, taken along line 4—4 of FIG. 3;

FIG. 5 is a front elevational view in section taken along line 5—5 of FIG. 3;

DESCRIPTION OF A PREFERRED EMBODIMENT

Figure 6:
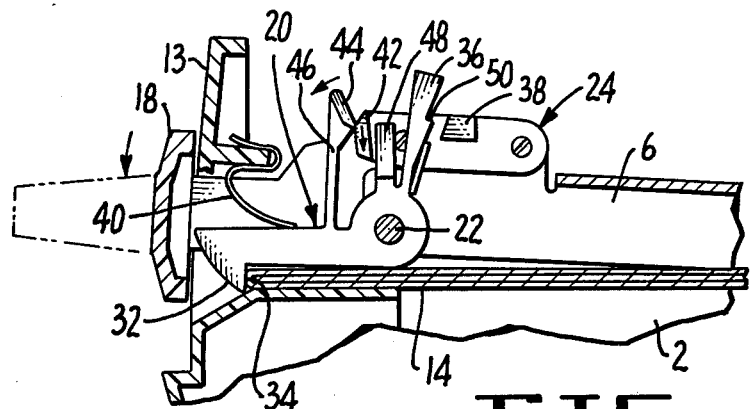
FIG. 6 is a side sectional view similar to FIG. 3 illustrating the events upon closing outer door and cartridge receiving means of the apparatus of FIG. 1.

A particularly preferred embodiment of the disc drive of this invention is illustrated in the fragmentary front perspective view of FIG. 1. It should be noted in this view that the numerous mechanical, electrical and electronic components of such a disc drive which form no part of the present invention have been deleted from this and all other views for purposes of clarity in illustrating the present invention. The deleted components suitably may be conventional in nature and such as are found in a fully operable Memorex Model 550 disc drive. Aside from those components omitted for purposes of clarity, the basic components of this disc drive for purposes of the present invention comprise the base or chassis 2 to which is mounted, by pivotal means 4, a panel 6 which is urged away from engagement with the chassis 2 by resilient biasing means such as compression springs 7. Affixed to the upper panel 6 and chassis 2 respectively are clamping element 8 and spindle 10 (FIG. 3), suitably similar to those disclosed in my U.S. Pat. No. 4,125,883, issued Nov. 14, 1978 entitled "Apparatus for Centering and Clamping a Flexible Magnetic Recording Disc in a Disc Drive." Formed in the chassis 2 are a pair of mutually opposed channels 12, shown in FIG. 5, dimensioned to provide for close but smooth insertion of a standard flexible disc cartridge 14 having a disc 16 contained therewithin. Attached to the front of chassis 2 is front plate 13 having a cartridge receiving aperture 15 extending thereacross with cartridge guides 17 and 19 for guiding an inserted cartridge into the channels 12. These channels 12 along with guides 17 and 19 in front plate 13, the panel 6, clamping element 8 and spindle 10 form a selectively openable and closable means for receiving the cartridge. This receiving means, when closed as described below, further serves to releasably clamp the recording disc within the cartridge in the position for recording and playback.

At the outer end of panel 6 a door 18 is mounted for movement with the panel 6 between a fully closed position covering front plate opening 15 and thus access to the receiving and clamping means and a fully opened position exposing access to the opening 15 and to the receiving and clamping means from outside the disc drive. As shown in FIG. 2, at least one, and preferably two, elements 20, suitably formed of a synthetic resin such as nylon, which can be molded in rigid or resilient sections, are pivotally mounted by shaft 22 to the chassis 2, each such element 20 having a plurality of portions which cooperate with actuating element 24 affixed to panel 6. As will be discussed more fully below, the elements 20 and 24 cooperate with one another and with the disc cartridge 14 to function as both an interlock to prevent closing of the panel 6 and door 18 on an improperly positioned disc 14, and also as a latch for releasably retaining a fully inserted disc within the drive. Suitably, the shaft 22 may be mounted to the chassis 2 by journalling within the portion of the front plate 13 which is rigidly affixed to the chassis 2, as shown in FIGS. 3 and 4. Door 18 is provided with a releasable locking tab 28 which releasably engages in a conventional manner the portions of front plate 13 surrounding slot 30 (FIG. 1).

The manner of operation of the cartridge receiving and clamping means and the interlocking means of this invention may be seen most clearly with respect to FIGS. 2, 3 and 6 through 9, which also illustrate the different portions of the element 20 and their associated functions.

Figure 7:
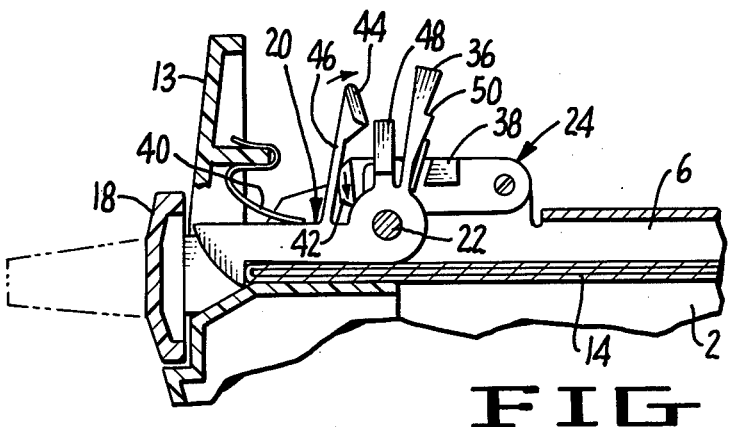
FIG. 7 is a side sectional view of the apparatus of FIGS. 1 and 3 with the door in its fully closed position.
Figure 8:
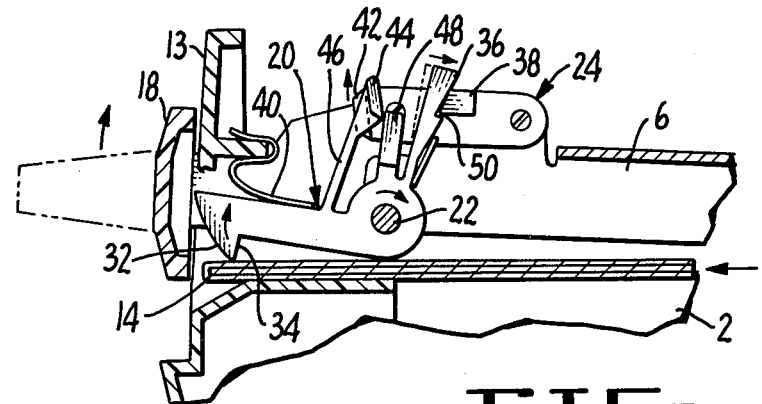
FIG. 8 is a side sectional view similar to FIG. 3 illustrating the events during the opening process of the door and cartridge receiving means.
Figure 9:
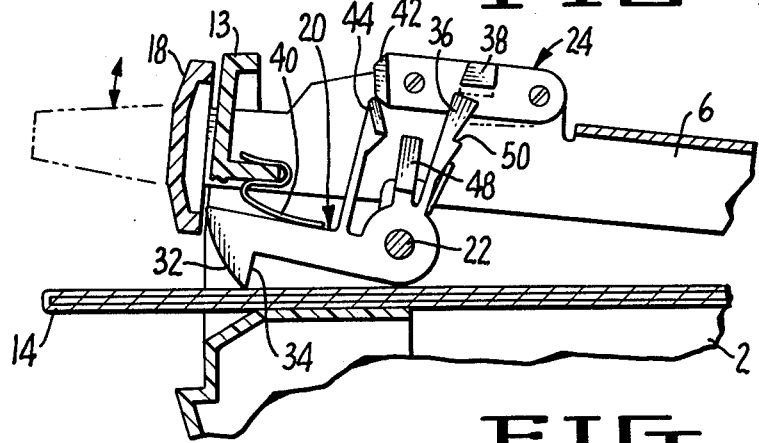
FIG. 9 is a side sectional view similar to FIG. 3 illustrating the operation of the interlock to prevent closing of the door upon a less than fully inserted cartridge.

FIGS. 3 and 6 through 9 illustrate the various conditions obtaining in the insertion of a cartridge 14 into and its removal from the disc drive of this invention. The initial phase of insertion of a disc into this disc drive, as well as the final phase of withdrawal of such cartridge is illustrated in FIG. 9. In this figure the cartridge 14 is partially inserted into the disc receiving and clamping means of the drive with a portion of the cartridge still remaining outside in the path of movement of the door 18. In this condition it is highly undesirable for the door and clamping means to be closable on the cartridge 14, since such action likely would result in damage to the cartridge 14 and the recording disc 16 contained therewithin. Accordingly, it is desirable to sense this condition and to prevent closing. As may be seen, partial insertion of the cartridge 14 deflects the cartridge insertion sensing means 32 of the element 20 upwardly to permit the passage of the cartridge past that element. In this deflected orientation the primary interlock blocking arm 36 of the element 20 is rotated into an interfering position with blocking ear 38 of actuating element 24 such that any attempt to close door 18 and the receiving and clamping means would result in the blocking engagement of ear 38 by the end of blocking arm 36, thus preventing such closure. This blocking arm 36 is sufficiently rigid to resist compressive deformation by such blocking engagement. This blocking orientation of element 20 is maintained as long as cartridge insertion sensing means 32 remains in contact with the upper surface of an inserted cartridge 14.

Once the cartridge 14 is fully inserted, as in FIG. 3, the element 20 may drop down to its lower position, with cartridge insertion sensing means 32 behind the cartridge 14, preferably under the urging of means such as leaf spring 40 which may be rigidly clipped onto a portion of the front plate 13. Since the element 20 may drop back down to this lower position only if the outermost edge of cartridge 14 is inserted past the cartridge capturing and locating means 34 and thus out of contact with cartridge insertion sensing means 32, this cartridge insertion sensing means 32 of the element serves as means for sensing the insertion of a disc cartridge 14 into the receiving and clamping means of the disc drive and for sensing whether the cartridge is fully inserted or not. When the cartridge is fully inserted, with its outermost edge past the cartridge capturing and locating means 34, the action of the spring 40 causes the element 20 to move to its lower position with a snapping motion, thus providing a tactile signal to the inserting operator indicating that the cartridge is fully inserted. As indicated in FIG. 3, full insertion of the cartridge brings the forward end of the cartridge into engagement with a second resilient element such as leaf spring 37 which is affixed to the chassis 2 in a conventional manner, such as by screws. The full insertion deflects this leaf spring 37 such that it provides resilient resistance to that insertion and urges the cartridge 14 outwardly and away from its fully inserted position to an eject position whenever the cartridge capturing and locating means 34 of the element is not in engagement with the cartridge 14. When the cartridge is fully inserted within guide channels 12 and the element 20 is moved to the lower position illustrated in FIG. 3, the urging of the cartridge 14 by spring 37 against the shoulder 34 of the element 20 causes that cartridge capturing and locating means 34 to function not only as a disc retaining means but also as means for providing registration of the cartridge within the disc drive.

With the disc cartridge 14 fully inserted into the disc guides and in suitable registration with the clamping element 8 and spindle 10, the receiving and clamping means and the door 18 may then be closed for operation of the disc drive. As illustrated in FIG. 6, moving the panel 6 to its closed position causes actuating tab 42 of element 24 to move past the angled pad 44 on the tripping arm 46 of element 20, deflecting it out of the way as tab 42 moves past. This movement of tab 42 past pad 44 further urges the element 20 rotatably to its lower position. As indicated, the pivoting of the element 20 to the lower position moves the blocking arm 36 out of the path of movement of the blocking ear 38 on actuating element 24 and thus permit closing of the panel 6 and door 18 and thus of the cartridge receiving and clamping means.

The fully closed configuration of the disc drive of this invention is illustrated in FIG. 7 with the door 18 closing access to the disc receiving and clamping means and serving to protect the cartridge 14 and its contained disc 16 during reading and writing by the disc drive. In this position the resilience of arm 46 has caused it to snap back to a position placing the angled pad 44 closer to the blocking arm 36, for purposes that will become apparent with respect to FIGS. 8 and 9. When the door is fully closed as in FIG. 7, the latch 28 (illustrated in FIG. 1) engages the portions of the front plate 13 surrounding the slot 30 and retains the door 18 and panel 6 and thus the cartridge receiving and clamping means closed.

When it is desired to remove the cartridge 14 from the disc drive, latch 28 holding the door 18 and disc receiving and clamping means closed is released in a conventional manner and the door 18 and panel 6 is moved away from that closed position, as illustrated in FIG. 8. The movement of the panel 6 necessarily also effects a corresponding movement of the actuating member 24 affixed thereto, moving it upwardly in FIG. 8. As illustrated, the actuating tab 42 and pad 44 of the actuating arm 46 of element 20 are so configured and positioned that, upon this opening movement of the panel 6 the rearward facing portion of tab 42 will engage the forward facing portion of pad 44. The angled configuration of tab 42 and pad 44 will thus effect a camming action of the arm 46 and deflect it rearwardly until it engages rigid arm 48 projecting from element 20, which prevents further rearward deflection of arm 46 with respect to the remainder of element 20. Thus, the rearward pressure exerted by tab 42 against the pad 44 will then effect pivoting of element 20 in a clockwise direction in FIG. 8. This clockwise pivoting raises the forward portion of element 20 which includes cartridge insertion sensing means 32 and the cartridge capturing and locating means 34, thus pivoting the cartridge capturing and locating means 34 out of its engagement with the cartridge 14 and releasing that cartridge for ejection outwardly of the disc drive under the influence of the previously described spring 37.

Once the cartridge 14 is so released from its fully inserted position through action of the cartridge release means and leaf spring 37 described above, it is desirable to prevent reclosing of the door and the cartridge receiving and clamping means in order to avoid improper engagement with the disc by the door 18 or by clamping element 8 and spindle 10. However, as illustrated in FIG. 8, the blocking ear 38 of actuating element 24 has not yet moved above the outer end of blocking arm 36 at the point in travel of panel 6 where the cartridge is initially released from cartridge capturing and locating means 34. Accordingly, a secondary interlock blocking shoulder 50 is provided intermediate the innermost and outermost portions of blocking arm 36 such that the pivotal movement of element 20 effected by the engagement between tab 42 and pad 44 will rotate that blocking shoulder 50 into a blocking position with respect to blocking ear 38 to prevent downward movement of blocking ear 38 and thus of panel 6 once the cartridge 14 has been released from its fully inserted position by movement of the door 18 toward its open position. Once the cartridge capturing and locating means 34 of the element 20 has been moved out of engagement with the cartridge 14 and the cartridge urged outwardly of its fully inserted position, the cartridge insertion sensing means 32 of the element 20 will then retain the element 20 in this clockwise pivoted position as long as the upper surface of the cartridge 14 engages the cartridge insertion sensing means 32, as described above.

Once the door 18 and panel 6 and their associated disc receiving and clamping means have been moved to the fully open position, illustrated in FIG. 9 and described above, the blocking arm 36 will be retained in its blocking relationship with respect to blocking ear 38 of element 24 as long as the cartridge 14 maintains the disc cartridge insertion sensing means 32 of element 20 in its raised position, thus preventing reclosing of the door 18 and the cartridge receiving and clamping means until the element 20 is permitted, under the influence of spring 40 to pivot back to the position illustrated in FIGS. 3 and 6, either by full insertion of the cartridge 14 or by complete removal of the cartridge 14 from the disc drive unit. As is apparent, when the cartridge 14 is either fully inserted or fully removed from the disc drive, the pivoting of the element 20 will again permit closure of the door 18 and of the disc receiving and clamping means.

While the foregoing has illustrated a particularly preferred embodiment of the disc drive and apparatus of this invention, it is to be understood that numerous variations and modifications, all within the scope of this invention, will readily occur to those skilled in the art. Accordingly, this invention is to be limited solely by the claims appended hereto and not by the foregoing description.

What is claimed is:

1. A disc drive for use with an operator-inserted flexible magnetic recording disc cartridge, comprising
   means selectively openable and closable for receiving such an inserted cartridge when open and releasably clamping the recording disc contained within said cartridge in a position for recording and playback when said receiving and clamping means is closed,
   door means selectively movable between a fully closed position covering and a fully open position exposing access to said receiving and clamping means from outside said disc drive,
   interlock means to prevent closing of said door means and said clamping means if an inserted cartridge is only partially inserted, said interlock means comprising
   cartridge insertion sensing means for sensing the insertion of a disc cartridge into said receiving and clamping means when said receiving and clamping means is open and for sensing whether said cartridge is fully inserted or not and for providing to the inserting operator a tactile signal when said cartridge is fully inserted, said cartridge insertion sensing means comprising a member which is both mounted for pivotal movement into and out of the path of insertion of said cartridge and which is resiliently urged pivotally into said path of insertion such that insertion of said cartridge into said receiving means forces said cartridge insertion sensing means out of said path of insertion until said cartridge is fully inserted into said receiving means,
   means cooperating with said cartridge insertion sensing means for preventing both closing of said receiving and clamping means and engagement between said door means and said cartridge if said inserted cartridge is less than fully inserted whereby the receiving and clamping means and door means may be closed over an inserted cartridge only if that cartridge is fully inserted, means resiliently urging an inserted said cartridge outwardly of said fully inserted position and cartridge retaining means for releasably retaining a fully inserted said cartridge in said fully inserted position, said cartridge retaining means comprising means adjacent and operatively connected to said cartridge insertion sensing means such that pivotal movement of said cartridge insertion sensing means out of said insertion path will move said retaining means out of the path of insertion and the path of removal of said cartridge and thus out of latching engagement with said cartridge.

2. A disc drive according to claim 1 wherein said cartridge insertion sensing member and said cartridge retaining latching means comprises a unitary structure.

3. A disc drive for use with an operator-inserted flexible magnetic recording disc cartridge, comprising means selectively openable and closable for receiving such an inserted cartridge when open and releasably clamping the recording disc contained within said cartridge in a position for recording and playback when said receiving and clamping means is closed, door means selectively movable between a fully closed position covering and a fully open position exposing access to said receiving and clamping means from outside said disc drive, said door means being adjacent the outermost edge of a fully inserted said disc cartridge, and interlock means to prevent closing of said door means and said clamping means if an inserted cartridge is only partially inserted, said interlock means comprising means for sensing the insertion of a disc cartridge into said receiving and clamping means when said receiving and clamping means is open and for sensing whether said cartridge is fully inserted or not by sensing passage of said cartridge outermost edge beyond the path of movement of said door means and for providing to the inserting operator a tactile signal when said cartridge is fully inserted, and means cooperating with said cartridge insertion sensing means for preventing both closing of said receiving and clamping means and engagement between said door means and said cartridge if said inserted cartridge is less than fully inserted, whereby the receiving and clamping means and door means may be closed over an inserted cartridge only if that cartridge is fully inserted.

4. A disc drive according to claim 3 further comprising means engaging and resiliently urging an inserted said cartridge outwardly of said fully inserted position, and means for releasably retaining, against said outward urging, a fully inserted said cartridge in said fully inserted position by engaging said cartridge outermost edge.

5. A disc drive according to claim 4 wherein engagement by said inserted cartridge outermost edge of said retaining means against the urging of said cartridge resilient urging means defines said fully inserted position of said cartridge.

6. A disc drive according to claim 4 further comprising means for effecting automatic release of said cartridge outermost edge by said cartridge retaining means upon movement of said door means from said fully open position to said fully closed position and back toward said fully open position, whereby, upon said release of said cartridge, the cartridge urging means may urge the cartridge outwardly of its fully inserted position.

7. A disc drive according to claim 6 further comprising means for preventing movement of said door means back to said fully closed position after said cartridge has been released by said retaining means from said fully inserted position, whereby the door means is prevented from closing upon a cartridge being urged outwardly of its fully inserted position by release of the cartridge retaining means.

8. A disc drive according to claim 4 wherein said cartridge insertion sensing means comprises a member both mounted for pivotal movement into and out of the path of insertion of said cartridge and resiliently urged pivotally into said path of insertion such that insertion of said cartridge into said receiving means forces said insertion sensing means out said path of insertion until said cartridge is fully inserted into said receiving means.

* * * * *